(12) United States Patent
Chen et al.

(10) Patent No.: US 8,947,456 B2
(45) Date of Patent: Feb. 3, 2015

(54) AUGMENTED REALITY PROCESS FOR SORTING MATERIALS

(75) Inventors: Sung-Wei Chen, Las Vegas, NV (US); Christopher J. Rothfuss, Laramie, WY (US)

(73) Assignee: Empire Technology Development LLC, Wilmington, DE (US)

( * ) Notice: Subject to any disclaimer, the term of this patent is extended or adjusted under 35 U.S.C. 154(b) by 317 days.

(21) Appl. No.: 13/515,404

(22) PCT Filed: Mar. 22, 2012

(86) PCT No.: PCT/US2012/030150
§ 371 (c)(1),
(2), (4) Date: Jun. 12, 2012

(87) PCT Pub. No.: WO2013/141862
PCT Pub. Date: Sep. 26, 2013

(65) Prior Publication Data
US 2013/0249943 A1  Sep. 26, 2013

(51) Int. Cl.
*G06G 5/00* (2006.01)
*G09G 5/00* (2006.01)

(52) U.S. Cl.
CPC ........................................ *G09G 5/00* (2013.01)
USPC ........... 345/633; 345/629; 345/630; 345/631; 345/632; 715/757

(58) Field of Classification Search
CPC ....... G06T 19/006; G06T 19/00; G06F 3/011; G06F 3/012; G06F 3/0304
USPC .................................. 345/629–633; 715/757
See application file for complete search history.

(56) References Cited

U.S. PATENT DOCUMENTS

| 4,915,827 | A | 4/1990 | Rosenthal |
| 5,134,291 | A | 7/1992 | Ruhl, Jr. et al. |

(Continued)

FOREIGN PATENT DOCUMENTS

| DE | 4120155 A1 | * | 12/1992 | ................ B03B 9/00 |
| DE | 4414112 A1 | * | 10/1995 | ................ B03B 9/06 |
| DE | 10127396 A1 | * | 12/2001 | ................ G06F 3/14 |

OTHER PUBLICATIONS

International Search Report and Written Opinion for PCT/US2012/030150 dated May 8, 2012.

(Continued)

*Primary Examiner* — Xiao Wu
*Assistant Examiner* — Todd Buttram
(74) *Attorney, Agent, or Firm* — Pepper Hamilton LLP

(57) ABSTRACT

Systems and methods for processing materials for a recycling workstream are disclosed. The system may include one or more sorting surfaces on which sortable items may be placed. Illumination sources may be provided to illuminate both the items and the sorting surface(s). A variety of sensor systems may also be provided. The outputs of the sensor systems may be supplied to a computing system for determining the composition of the items and their location on the sorting surface(s). The computing system may also control the surface(s), illumination sources, and sensor systems. Additionally, the system may include one or more augmented reality interface devices used by sorters at the sorting facility. The computing system may communicate data streams to the augmented reality interfaces to provide the users augmented reality sensations. The sensations may give the users information and instructions regarding how to sort the items into one or more sorting bins.

26 Claims, 6 Drawing Sheets

(56) References Cited

U.S. PATENT DOCUMENTS

| | | | |
|---|---|---|---|
| 5,322,441 | A | 6/1994 | Lewis et al. |
| 5,794,788 | A | 8/1998 | Massen |
| 7,110,909 | B2 | 9/2006 | Friedrich et al. |
| 7,138,963 | B2 | 11/2006 | Hobgood et al. |
| 7,714,895 | B2 | 5/2010 | Pretlove et al. |
| 8,670,939 | B2 * | 3/2014 | Yoon et al. .................. 702/5 |
| 2004/0095571 | A1 * | 5/2004 | Bourely et al. ............ 356/237.1 |
| 2012/0263154 | A1 * | 10/2012 | Blanchflower et al. ....... 370/338 |
| 2012/0320088 | A1 * | 12/2012 | Ihara et al. .................... 345/629 |
| 2013/0044128 | A1 * | 2/2013 | Liu et al. ....................... 345/633 |

OTHER PUBLICATIONS

Ashmad, A New Technology for Automatic Identification and Sorting of Plastics for Recycling, *Environmental Technology* (2004), 25(10):1143-1149 (Abstract).

Fite-Georgel, Is there a Reality in Industrial Augmented Reality?, IEEE International Symposium on Mixed and Augmented Reality (Oct. 26-29, 2011), Basel, Switzerland, *Science and Technology Proceedings*, pp. 201-210.

Florestan et al., Recycling of plastics: Automatic identification of polymers by spectroscopic methods, *Resources, Conservation and Recycling* (Apr. 1994), 10(1-2):67-74.

Khoury et al., Evaluation of position tracking technologies for user localization in indoor construction environments, *Automation in Construction* (Oct. 27, 2008), 18:444-457.

Van Krevelen et al., A Survey of Augmented Reality Technologies, Applications and Limitations, *The International Journal of Virtual Reality* (2010), 9(2):1-20.

Maisano et al., Indoor GPS: system functionality and initial performance evaluation, *Int. J. Manufacturing Research* (2008), 3(3):335-349.

Scott, A two-colour near-infrared sensor for sorting recycled plastic waste, *Measurement Science and Technology* (Feb. 1995), 6(2) (Abstract).

Van Den Broek et al., Identification of Plastics among Nonplastics in Mixed Waste by Remote Sensing Near-Infrared Imaging Spectroscopy. 1. Image Improvement and Analysis by Singular Value Decomposition, *Analytical Chemistry* (Oct. 15, 1995), 67(20):3753-3759.

Wienke et al., Identification of Plastics among Nonplastics in Mixed Waste by Remote Sensing Near-Infrared Imaging Spectroscopy. 2. Multivariate Image Rank Analysis for Rapid Classification, *Analytical Chemistry* (Oct. 15, 1995), 67(20):3760-3766.

Transparent OLEDs, http://web.archive.org/web/20120219205857/ http://www.oled-info.com/transparent-oleds, accessed on Aug. 11, 2014, pp. 1-4.

\* cited by examiner

AUGMENTED REALITY PROCESS FOR SORTING MATERIALS

CLAIM OF PRIORITY

This application is a U.S. national stage filing under 35 U.S.C. §371 of International Application No. PCT/US2012/030150 filed Mar. 22, 2012 entitled "Augmented Reality Process for Sorting Materials," the disclosure of which is incorporated by reference in its entirety.

BACKGROUND

According to EPA estimates, Americans produced about 250 million tons of non-hazardous waste in 2010. The non-hazardous waste was composed of a variety of materials include paper, plastics, metals, rubber, wood, and glass. Of this material, only about 34% had been recycled. Recycling provides several economic benefits over de novo production, including reduced energy costs and reduced consumption of raw resources. One difficulty for recycling lies in separating the recyclable materials found in everyday trash. Not only can the waste be separated by type, such as separating rubber containing material from glass, but the material may be further separated by composition. Glass, for example, may be clear, green, or amber. Plastics may include polystyrene, polyethylene terephthalate, high density polyethylene, low density polyethylene, and polypropylene. In addition, some consumer goods, such as some types of beverage containers, may have components having different compositions. While it may be possible to encourage consumers to separate their glass waste according to color, consumers may not be able to recognize and properly sort plastics by composition. For this reason, consumer waste may be brought to a sorting facility in order to separate recyclable material from non-recyclable material, and further sort by composition and binned accordingly. The binned materials may then be shipped to recycling facilities for further processing.

Consumer waste may cover a wide variety of materials, and arrive from a variety of sources. The waste produced by the various sources may differ according to the source. Thus, it is reasonable to expect that the type of waste generated by a restaurant may differ from that generated by a household. For example, a restaurant may generate more food waste (non-recyclable) and the household may generate more rubber waste (rubber bands, erasers). It may be more efficient for a sorting facility to have adaptive workflow methods that take into account the expected type of waste generated by different sources. Such adaptation may include the number and size of receptacles, as well as the number and placement of the sorting personnel within the sorting facility.

SUMMARY

In an embodiment, a system for processing materials for a recycling workstream includes one or more sorting surfaces able to hold at least one or more sortable items, at least one bin to receive at least one of the sortable items, at least one illumination source to illuminate the sortable items and one or more sorting surfaces while the sortable items are on the one or more sorting surfaces, at least one sensor system having an output and at least one sensor input obtained from the one or more sortable items while one or more sortable items is on the at one or more sorting surfaces, one or more augmented reality interfaces having at least one input and at least one output, the at least one output providing the augmented reality interface user with at least one augmented reality sensation, and a computing system in data communication with the one or more sensor system outputs and the one or more augmented reality interface inputs, in which the computing system provides one or more augmented reality data streams to the one or more augmented reality interfaces based at least in part on an analysis of the output of one or more sensor systems, and further in which the one or more augmented reality data streams contain information regarding sorting the one or more sortable items into the one or more bins to the users of the one or more augmented reality interfaces.

In an embodiment, a method of processing materials for a recycling workstream includes the steps of providing one or more sorting surface to hold one or more sortable items, providing at least one bin to receive the one or more sortable items, illuminating one or more sortable items and one or more sorting surfaces using one or more illumination sources while the one or more sortable items are on the one or more sorting surfaces, having one or more sensor systems, each having a sensor output, receive one or more sensor inputs from the one or more sortable items while the one or more sortable items are on the one or more sorting surfaces, providing at least one augmented reality interfaces each having at least one input and at least one output, the output providing one or more augmented reality interface users with one or more augmented reality sensations, and providing a computing system in data, communication with the one or more sensor system outputs and the one or more augmented reality interface inputs, in which the computing system supplies one or more augmented reality data streams to the one or more augmented reality interfaces based at least in part on an analysis of the outputs of the one or more sensor systems, and further in which the one or more augmented reality data streams contain information regarding sorting the one or more sortable items into the at least one bin to the users of the one or more augmented reality interface.

DETAILED DESCRIPTION

Figure 1:
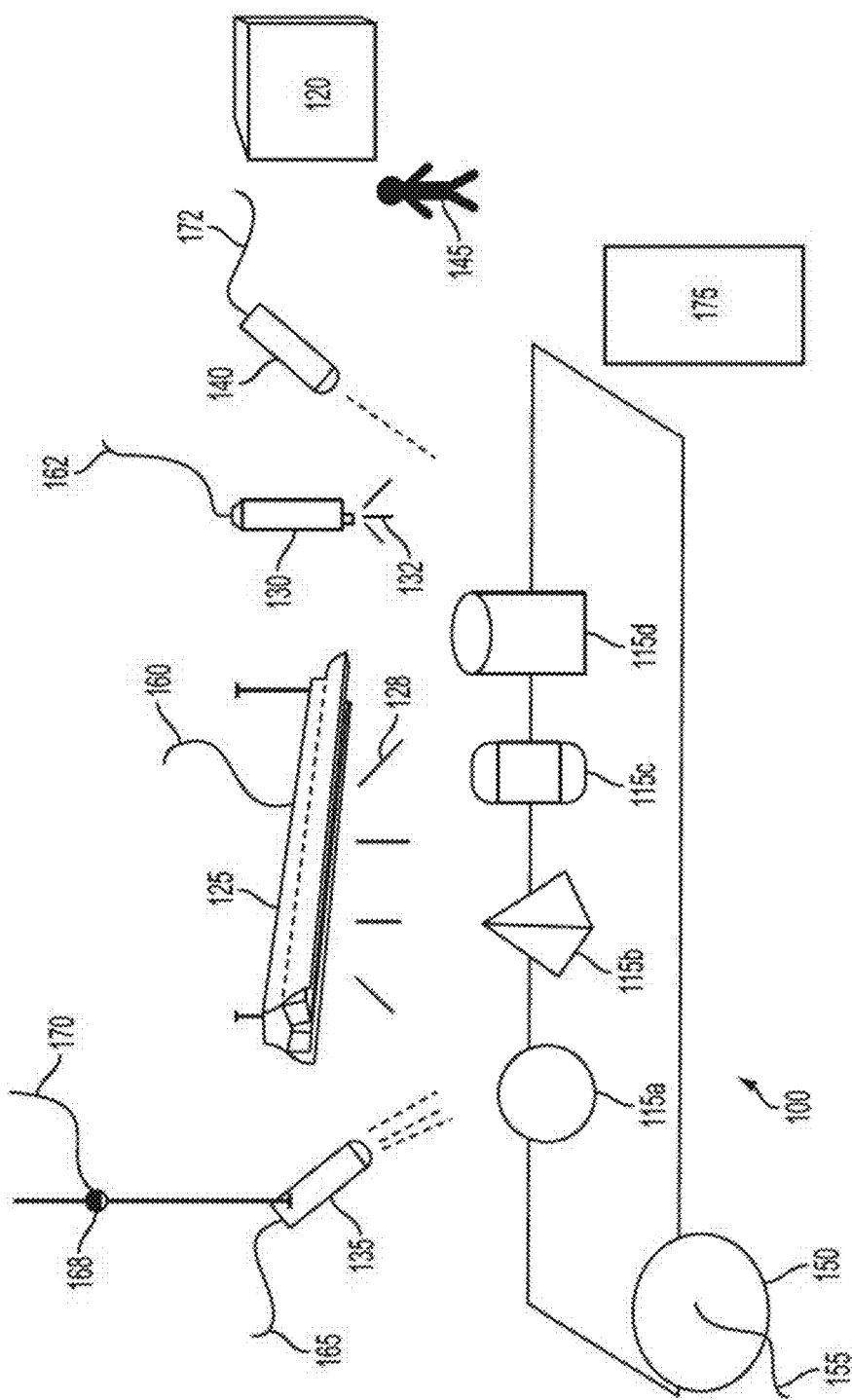
FIG. 1 illustrates an embodiment of a system for processing materials for a recycling workstream in accordance with the present disclosure.

Waste sorting may be accomplished manually or automatically. Manual sorting techniques take advantage of the human ability to adapt to changes in the environment. A human sorter may readily identify different shaped and sized articles, handle them appropriately, and place them in an appropriate bin regardless of the bin's location with respect to the drop-off point of the sorted article in a sorting facility. However, a human sorter may not be able to recognize the composition of the sortable items, and therefore may not properly bin the items by composition.

Automated sorters may possess some ability to determine the composition of the material to be sorted by a variety of spectroscopic and other analytical techniques. As one non-limiting example, the items may be illuminated by light in the near IR spectral region (about 800 nm to about 2500 nm) and a sensor system may measure a reflectance spectrum from the items. The automated system may then use the sensor system information to determine the composition of the item, such as by comparing the sensor system output to spectra of known materials. However, automated sorters may become confused if presented with a variety of items that physically overlap on a sorting conveyor, and may not recognize that the overlapping items are distinct. Additionally, some items, such as plastic beverage containers, may be constructed of multiple materials. A beverage cap, for example, may be made of a different plastic than the rest of the container. An automated sorting system may become confused by receiving composition data from both the cap and the container, and thus may not be able to identify the composition of the container. Additionally, the automated sorter may not be able to remove the cap from the container, an action more readily accomplished by a human sorter.

The system and method disclosed below may take advantage of both the human and automated sorting processes by providing the adaptable human sorter with automated information regarding the composition and location of items to be sorted. In one embodiment, some computing system derived information may be presented to a human worker using an augmented reality interface. The interface may indicate to the worker the composition of an item on a sorting surface, and inform the worker which bin may receive the item. The interface may present the information in any of a number of different modalities, including but not limited to a heads-up visual display, or an audio message. The interface may also permit the workers to communicate among themselves to allow cooperative action, such as allowing several workers to sort particularly heavy or bulky items.

A computing system may be provided to coordinate the interactions among the user augmented reality interfaces, the illumination sources, and the sensors. In one embodiment, the computing system may control the spectrum of the illuminating sources, for example by causing filters of known transmittance to be placed between the source and the sortable items. In another embodiment, the computing system may control the position of the sensor systems with respect to the sortable items by means of motion control devices associated with the sensor systems. In another embodiment, the computing system may also control the motion of the items on the sorting surface by issuing commands to motor controllers that may move the surface (such as a conveyor).

Additional capabilities of the system and method are provided below by reference to the various figures provided.

FIG. 1 illustrates one embodiment of a system for processing materials in a recycling workstream 100. The system may include one or more sorting surfaces 110 on which the sortable items 115a-f may be placed or carried. The sortable surface(s) may also be movable by means of one or more motion control devices 150a,b. The system also may include one or more sorting bins 120a-c to receive the sorted items from the sorters 145a-c. In addition, the system may include one or more sources of illumination, 125 and 130, respectively, and one or more sensor systems, 135 and 140, respectively. The system may also include one or more computing systems 175 configured to automate the action of the motion control devices 150a,b, control the one or more sources of illumination 125 and 130, and operate and/or receive data from the one or more sensor systems 135 and 140.

One or more sorting surfaces 110 may be provided to receive the items 115a-f for sorting. A sorting surface may be stationary, and may receive the sortable items by any of a variety of means including receiving boxes of material from workers at the sorting facility, or receiving individual items by means of an automated conveyor system from a truck or other transporting devices or vehicles. The one or more sorting surfaces may also be mobile. In one non-limiting example, the sorting surface or surfaces may be composed of one or more moving surfaces such as conveyors. In one embodiment, a conveyor-type surface may have a distinct end to receive the items, and a separate end where the sorters may operate. Alternatively, the sorters may be disposed along the sides of the conveyors. In another embodiment, the conveyor may form a closed path, allowing items not sorted by the sorters during a first pass to be sorted during a second pass. In yet another embodiment, the sorting surface may be directed to move in a first direction and then a second direction. For example, a conveyor may move an item in a forward direction through a compositional analysis station, and then may move backwards to permit the item to be re-analyzed if the initial analysis appeared to be faulty.

The moving sorting surface(s) may be powered by one or more surface motion controllers 150a,b. The controllers may operate one or more actuators to move pulleys, rollers, or similar devices to keep the surface moving. Such actuators may include non-limiting devices such as DC motors, AC motors, and stepper motors. The controllers 150a,b may include any of a number of motion controllers as known in the art, and may control the actuators based at least in part on one or more instructions received from an instruction source such as a computing system. The instructions, and possible feedback information, may be directed over one or more motion control interface lines 155.

As disclosed above, the sortable items 115a-f may come in any of a variety of shapes, sizes, and other physical attributes. Additionally, they may be composed of any of a variety of materials. Non-limiting examples of physical attributes may include spherical, cylindrical, flat, and irregularly shaped items in linear sizes from less than about 0.5 cm to over 3 m. Non-limiting examples of composition may include a variety of glasses, plastics, food-stuffs, and metals. In addition, some items may be composed of a number of different components, each having a different composition. For example, certain beverage containers may have a polypropylene cap with a polyethylene terephthalate body.

The physical process of sorting the items may rely on one or more sorters 145a-c physically transporting the sortable items 115a-f from the sorting surface 110, and depositing the items into bins 120a-c according to their composition. As disclosed above, it is reasonable to expect that the composition of recyclable materials may differ depending on their respective sources. As a result, the required number and size of the bins may depend on the source of the recyclable items. For example, if the waste source is from a restaurant, it may be expected that much of the waste may comprise food-stuffs that cannot be recycled. Thus, a sorting facility may want to optimize its workstream by providing a large receptacle for foodstuffs for restaurant-derived waste. Alternatively, the waste from an office may comprise a significant amount of plastics (e.g. polystyrene coffee cups), paper, and metal (e.g. paper clips). Consequently, the sorting facility may require a larger bin for polystyrene for office-derived waste. Larger bins may be located closer to the sorters, or, alternatively, some bins for some compositions may be located at preferential locations in the sorting facility. For example, bins to receive non-recyclable foodstuffs may be located close to a loading bay door where the bins may be moved outside for transport to a landfill. Human workers 145*a-c* may readily adapt to changes in their work environment that may prove challenging in an automated facility. The manner in which the sorters 145*a-c* receive sorting information, including item composition and the bin into which the items may be deposited, is disclosed below.

In some embodiments, the system may also include one or more sources of illumination, 125 and 130, respectively. One type of illumination source 125 may provide standard indoor illumination 128, such as from one or more incandescent or fluorescent sources. Such illumination 128 may include at least one wavelength in the visible range from about 350 nm to about 750 nm. Illumination 128 may be used by sorters 145*a-c* to see in the facility. Illumination 128 may also be used to illuminate the items 115*a-f* and/or the sorting surface 110 on which they are carried. The output of illumination source 125 may further be controlled by means of a control line 160. The illumination may be controlled, for example, by a computing system 175. Non-limiting examples of such control may include turning the illumination source on or off, or varying the output intensity by dimming or increasing the illumination intensity.

An additional type of illumination source 130 may provide illumination 132 of a specified wavelength or group of wavelengths to illuminate the items for analytical purposes. It is understood that illumination source 130 may be the same type as illumination source 125, and the illumination 132 may have the same spectral characteristics as illumination 128. Alternatively, illumination source 130 may differ from source 125, and illumination 132 may have different spectral characteristics from those of illumination 128. As non-limiting examples, illumination source 130 may comprise a laser producing monochromatic illumination, or a source of narrowband IR illumination. In one embodiment, illumination 128 may be polarized in any of a number of ways including linear polarization and circular polarization.

Illumination sources 130 may also be controlled through control lines 162. In one embodiment, the source of illumination control may be from a computing system 175. In another embodiment, a human operator may provide control information to illumination source 130. In one non-limiting example, the control may take the form of controlling the illumination source to provide pulsed or continuous or both pulsed and continuous illumination 132. Illumination solace 130 may also incorporate any number or type of optical elements, or other elements to control or shape illumination 132. Non-limiting examples of such elements may include lenses, filters, slits, mirrors, beam splitters, and collimators. The control line 162 may further control the operation of these optical elements. For example, illumination source 130 may comprise a near-IR source providing illumination 132 having at least one wavelength from about 800 nm to about 2550 nm. Illumination source 130 may also comprise a rotatable series of filters so that only a selected group of wavelengths may illuminate the sortable items. In one embodiment, such filters may restrict illumination 132 to wavelengths from about 1548 nm to about 1578 nm, from about 1545 nm to about 1655 nm, from about 1655 nm to about 1745 nm, from about 1700 nm to about 2150 nm, from about 2207 nm to about 2320 nm, or from about 2115 nm to about 2550 nm.

Although the examples disclosed above regarding illumination sources 125 and 130 and their illumination (128 and 132, respectively) appear to be directed to photon sources in the visible spectral region (photons having radiation from about 350 nm to about 750 nm) or near-IR spectral region (photons having radiation from about 750 nm to about 2500 nm), it is understood that such illumination sources are not restricted to providing radiation in such a narrow range. Specifically, illumination sources 125 and 130 may also include sources of x-ray radiation (photons having radiation from about 0.01 nm to about 10 nm), UV light (photons having radiation from about 10 nm to about 350 nm), far-IR radiation (photons having radiation from about 2500 nm to about 25000 nm), microwave radiation (photons having radiation from about 1 mm to about 1000 mm), and radio-frequency radiation (photons having radiation from about 1000 mm to about 10 m). Consequently, illumination 128 and 132 may include photons anywhere from about 0.024 nm to about 1000 mm.

Illumination 128 and 132 may be detected in a number of ways for a variety of purposes. One potential use of visible illumination is to light the sorting facility so that workers 145*a-c* are able to move around and bin the sortable items. Alternatively, illumination may be used by a variety of sensors or sensor systems (135 and 140) to provide analytical input to a computing system for analysis. For example, the illumination may be reflected from, diffracted from, dispersed from, or transmitted through the sortable items 115*a-f* while they are on the sorting surface 110. The illumination may also be reflected from or dispersed from the sorting surface 110, including from any indicia that may be incorporated on it. The illumination, having impinged upon and/or interacted with either the items or the surface, may provide an input to any one or more of the sensor systems, 135 and 140.

One type of sensor system may include one or more camera systems, 135. In one embodiment, the camera systems may be used to provide location data of the sortable items while they are on the sorting surface. The camera systems may also be used to determine the location of the sorters 145*a-c* within the facility. In one non-limiting embodiment, the camera systems 135 may take advantage of the ambient illumination 128 produced by visible light sources 125. The camera systems 135 may incorporate any of a variety of sensors including, but not limited to, a CCD sensor and a CMOS sensor. The sensor systems, including camera systems, may be static with respect to their location in the sorting facility and/or field of view. The sensor systems may also be mobile. For example, as illustrated in FIG. 1, camera systems 135 may be mounted on motion devices 168 capable of moving the position and/or field of view of the camera to focus on a variety of sortable items or on the sorting surface. The camera motion systems 168 may be controlled by receiving instructions over a motion control interface line 170. The camera systems 135 may also include control lines 165 that may include one or more data output lines to communicate the camera input data with a downstream computing system 175. The control lines 165 may also provide control data to the camera systems 135; non-limiting examples of such control may include controls of camera focus, depth of field, or aperture.

In addition to camera systems 135, other sensor systems are anticipated. Such sensor systems 140 may be considered analytical systems, although it is understood that the descriptor "analytical" is not limiting in terms of sensor system function. Such analytical sensor systems 135 may be directed to detect the effects of the illumination 132 interacting with the sortable items 115*a-f* while they are located on the sorting surface 110. In one embodiment, the sense data obtained by the sensor systems may comprise data associated with energy reflected from, diffracted by, scattered by, emitted from, absorbed by, or transmitted through the sortable items. Such energy detected by the sensor systems 140 may be in the form of photons or particles (e.g. electrons). The sensor systems 140 may comprise any one or more sensors appropriate for detecting the sensed energy. Thus, as non-limiting examples, the sensors may comprise one or more of a CCD sensor, a CMOS sensor, a photodiode array, an ammeter; a voltmeter, a magnetometer, a multichannel plate, an electron multiplier, a phosphor screen, a kelvin probe, or an electron tunneling probe. The analytical sensors 140 may also comprise elements to shape, qualify, or otherwise alter the energy received by the sensors according to associated optical elements. In one non-limiting example, the illumination 132 of an item may comprise a narrow band of near-IR illumination (having at least some wavelengths from about 750 nm to about 2500 nm). Sensor systems 140 may detect light reflected from the item filtered through a variety of band-pass filters to determine the amount of photons reflected from the item at wavelengths from about 1548 nm to about 1578 nm, from about 1545 nm to about 1655 nm, from about 1655 nm to about 1745 nm, from about 1700 nm to about 2150 nm, from about 2207 nm to about 2320 nm, or from about 2115 nm to about 2550 nm. It is understood that optical elements associated with such analytical sensor systems may include a variety of elements, including, but not limited to, any one or more of polarizing filters, low-pass filters, high-pass filters, band-pass filters, notch filters focusing lenses, collimators, slit assemblies, beam splitters, and mirrors. Sensor systems configured to detect particles such as electrons may also include electrostatic or electromagnetic focusing elements. The sensor systems 140 may provide output data over a communication line 172, and provide data to a down-stream computing system 175. The output data may include, as non-limiting examples, spectral data of the energy sensed by the system, or even a complete analysis of the composition of the item providing the sensed energy. The communication line 172 may also provide control instructions to the sensor systems 140. For example, a sensor system 140 may incorporate multiple filters housed on an automated optical element moving system (such as a filter wheel). Data communicated over the communication line 172 may provide further instructions regarding the placement or motion of the optical elements with respect to the optical path of the sensor system 140.

Although, as an example, the illumination received by sensor system 140 may originate from illumination source 130 emitting illumination 132 of a potentially narrow type, it is understood that the "analytical" sensor systems 140 may also use illumination 128 from a broad-band illumination source 125 used, in part, for more general illumination purposes. Nothing in this disclosure should be taken to limit a specific sensor system from using illumination from a specific type of illumination source.

The sortable items 115a-f may be sorted by one or more sorters 145a-c, who may remove the items from the sorting surface 110 and place them in bins 120a-c located in any of a number of locations throughout the sorting facility. As disclosed above, items may be placed in the bins according to the item composition. While the sorters may become familiar with the qualities of various items to permit them to recognize an item's composition upon inspection, such familiarity may take some time to develop. It would be more efficient for the sorters to receive compositional information for each item, as well as the bin to receive the item. Such information may be provided to the sorters via an augmented reality interface.

Figure 2:
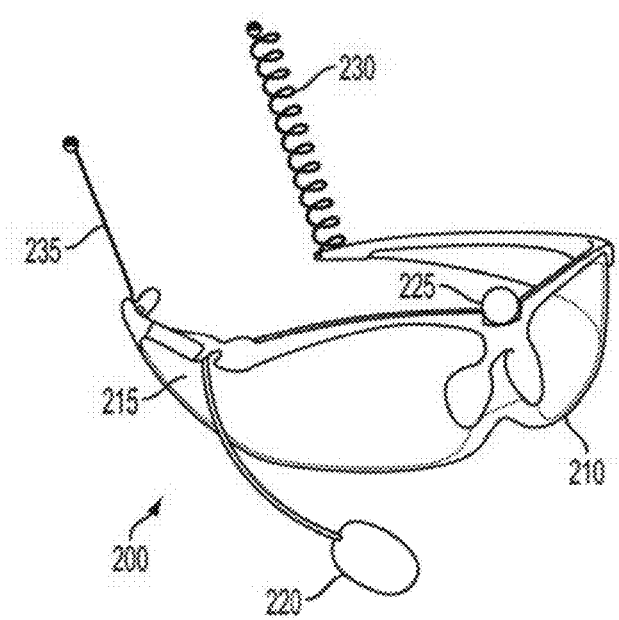
FIG. 2 illustrates an embodiment of an augmented reality interface in accordance with the present disclosure.

FIG. 2 illustrates one embodiment of an augmented reality (AR) interface 200. AR interfaces may provide the sorters using them (the AR interface users) with any number or type of augmented reality sensations, including, without limitation, visual sensations, or audio sensations. The AR interface may comprise, as non-limiting examples, one or more visual interfaces 210, audio interfaces 215, voice recognition or voice input interfaces 220, gesture or location recognition interfaces 225, and localization interfaces 230.

A visual interface 210 may be used to present one or more visual AR sensations to the interface user. Visual sensations may include, without limitation, text data, image data, or visual indicia, any one or all of which may overlay the field of view of the AR interface user. In one embodiment, the visual interface 210 may comprise any one or more of an organic LED, an LCD, an inorganic LED, a thin film transistor, a quantum dot display, or a carbon nanotube display interface.

An audio interface 215 may provide audio AR sensations to the user. Audio sensations may include, without limitation, synthesized voice instructions from a computing system, vocal directions from a supervisor, or conversations among other AR interface users. In one embodiment, the audio interface 215 may comprise one or more air motion transformers, piezoelectric films, ribbon planar magnets, or magnetostriction devices.

A voice input or voice recognition interface 220 may provide an interface for an AR user to provide voice feedback to any supplier of the audio sensations. For example, a computing system may be configured to receive the voice input and respond to voice commands or questions from the AR users through voice recognition software. The voice input may also be used to relay vocal comments to supervisors, or permit one AR interface user to communicate directly over wireless or radio links with other AR interface users, such as during cooperative interactions. The voice input interface 220 may comprise any one or more of a number of interface devices including, without limitation, one or more air motion transformers, piezoelectric films, ribbon planar magnets, or magnetostriction devices.

A gesture or location interface 225 may provide visual feedback through the AR interface. In one embodiment, the gesture or location interface 225 may include a small camera directed away from an AR user. The camera may provide video input through the AR interface that may be used by any one or more of a computing system, a supervisor, or other AR interface users. As one example, the video input may be used by a computing system to determine the field of view of the AR user. In another example, the video input may be transmitted to a computing system to record AR user gestures, such as pointing to any one or more sortable items on the sorting surface. In yet another example, a supervisor may be able to visualize the field of view of an AR user on a video monitor. In one embodiment, such a gesture or location interface 225 may comprise either a CCD or CMOS video camera.

A localization interface 230 may also be provided as a means for determining the location of the user wearing the AR interface. In one embodiment, the localization interface 230 may comprise an indoor GPS (global positioning) system. In one embodiment, such a system may rely on a number of iGPS transmitting devices positioned at known locations throughout the sorting facility. The transmitting devices may interact with sensors 230 incorporated into the AR interface of each worker. Triangulation techniques may be used to determine the location of each AR interface with respect to some or all of the iGPS transmitting devices. In one embodiment, the localization data regarding the position of the AR interface users may be transmitted to a computing system (FIG. 1 element 175) from the iGPS transmitters. In another embodiment, the localization data may be transmitted by a central computing system associated with the iGPS system to the computing system (FIG. 1 element 175). In another embodiment, the localization data may be transmitted to the computing system (FIG. 1 element 175) by the AR interfaces.

In yet another embodiment, the computing system (FIG. 1 element 175) may also control the iGPS system directly.

An AR interface unit 200 may be in data communication with the main computing system as well as with other AR interface units by means of communication interface 235. In one embodiment, data related to augmented reality sensations may be transmitted by the computing system and received by the AR interface as one or more augmented reality data streams. Alternatively, the AR interface unit may supply output data to any of a number of other devices including the computing system as well as other AR interface units. The communication interface 235 may transmit or receive these data over any number of communications channels including, but not limited to, radio frequency transmissions, IR pulse encoded transmissions, and/or wired interface transmissions. It may be appreciated that communication interface 235 in FIG. 2, while represented by an antenna for receipt of wireless communications, may comprise any communication interface between an AR interface and any other device.

Figure 3:
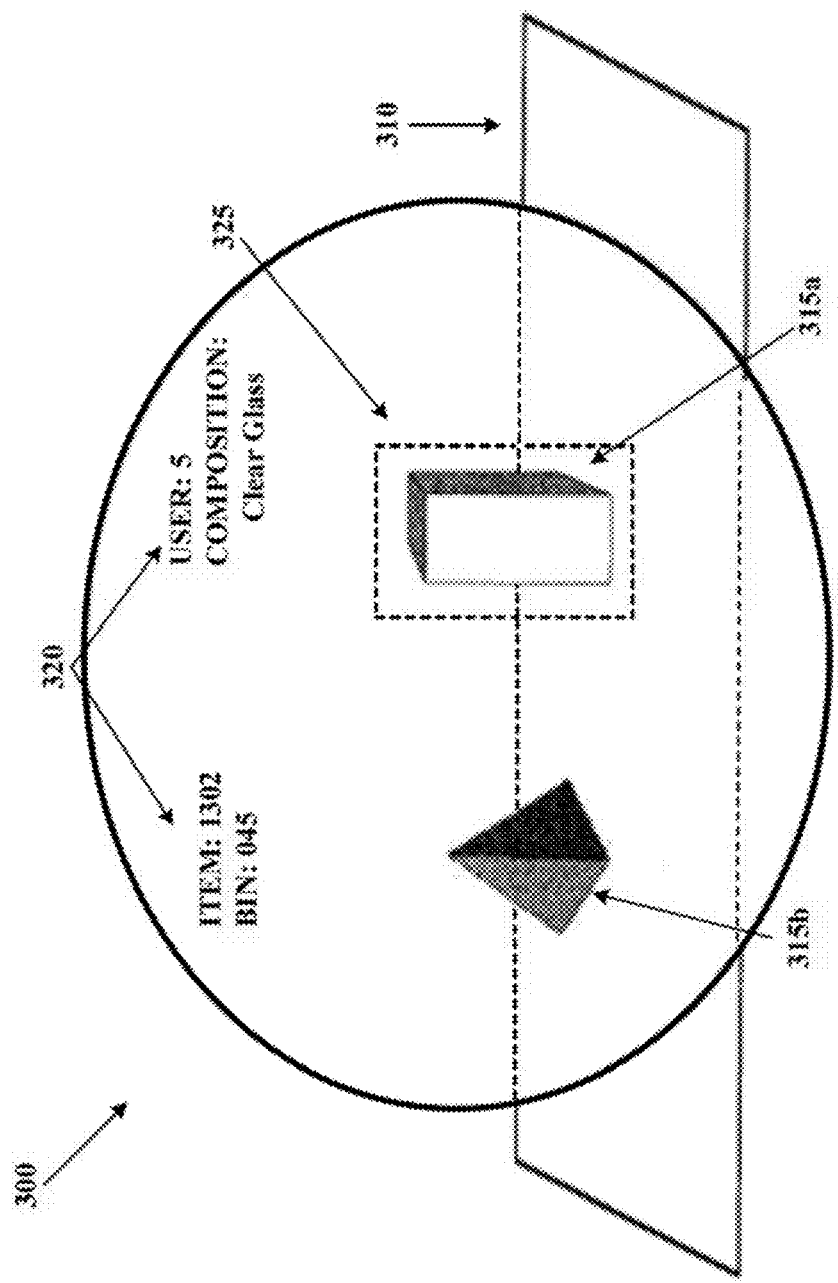
FIG. 3 illustrates an embodiment of a view through a visual interface component of the augmented reality interface in accordance with the present disclosure.

An augmented reality interface device may provide its user with sensation related information to augment the information the user may normally obtain through sense modalities. For example, visual based augmented information may be used by the user in addition to the information available in the normal visual field. FIG. 3 illustrates merely one embodiment of how an AR interface may provide visual sensations to an AR interface user working in a recyclable sorting facility. An AR interface user may observe a group of sortable items 315a,b transported on a moving sorting surface 310. The AR interface user's field of view 300 may incorporate both a view of the items and surface, as well as additional visual information overlaid on the observed scene. In one embodiment, the additional information may appear as text 320 superimposed on the observed scene. Such text may include any information relevant to a particular sorting procedure including, but not limited to, an item identification tag (such as a number), an identifier of a bin to receive the item (such as a bin number), an identifier of the user (for example an employee ID number or name), and a description of the composition of the item being sorted (for example, clear glass). In addition to text information, various graphical indicia may also be included in the visual interface. For example, the text data may refer to a particular item 315a in the field of view. A visual indicium, such as a contrasting color highlight 325 surrounding the image of an item 315a, may indicate to the user that the highlighted item is the item referenced by the text. It is understood that visual information presented to the AR user may include a wide variety of indicators comprising a variety of information. In another embodiment, the AR interface may overlay a colored outline on an item, the color being an indicator of the bin to receive the item. Alternatively, the visual interface may cause a cross or other graphical symbol to cover an item, thereby indicating that the sorter should not sort that item, but to let it pass.

Although FIG. 3 illustrates an example of a visual augmented reality interface, it may be understood that an AU interface may also relay information in audio format or other sensory format to the user. For example, a first AU interface user may observe a color indicium 325 overlaid on an object 315a in the field of view 300, and simultaneously hear an instruction that another sorter will be required to assist the first in placing the item in an appropriate bin.

Figure 4:
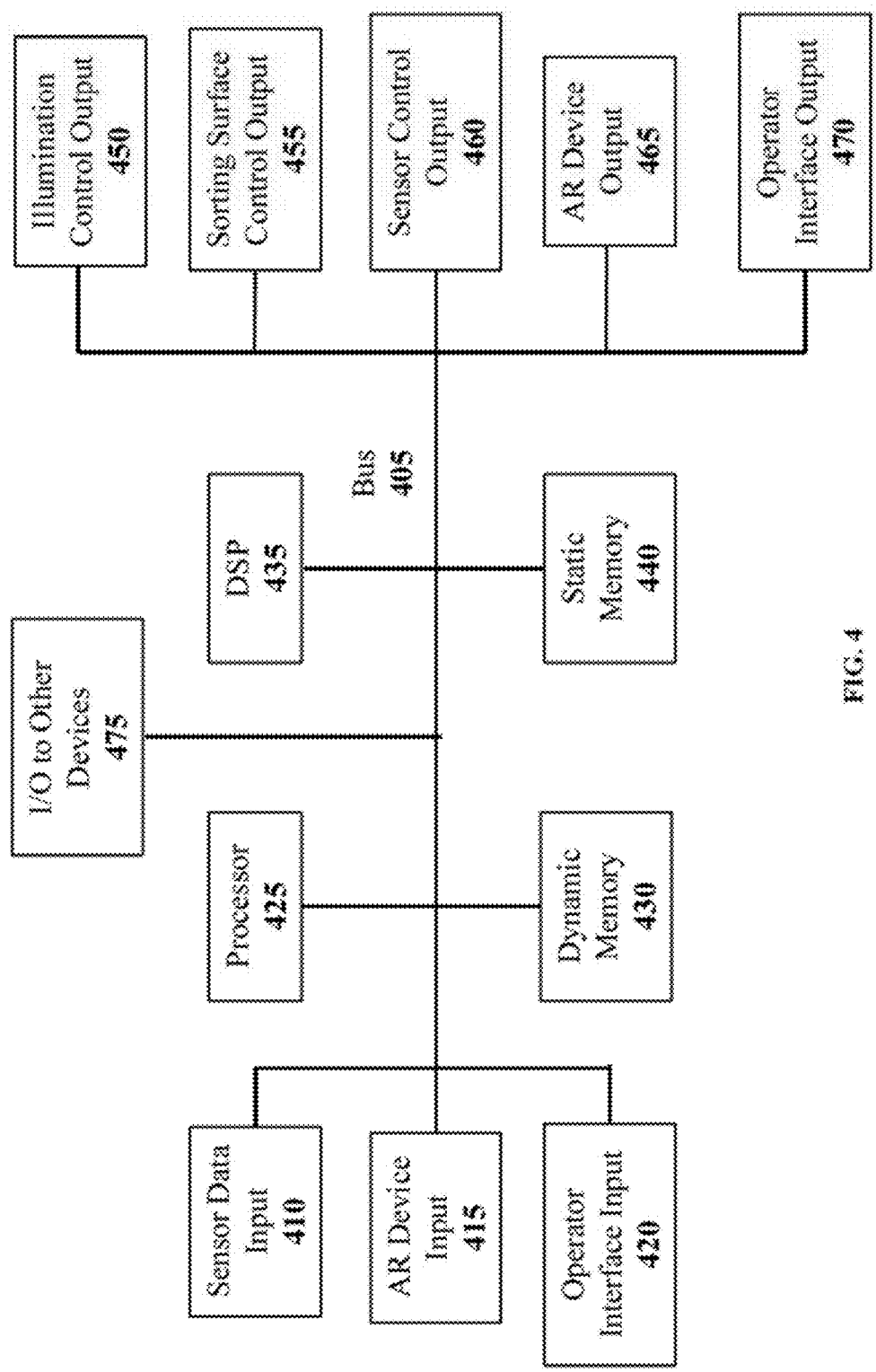
FIG. 4 illustrates an embodiment of a computing system in accordance with the present disclosure.

In addition to the components of the system for processing and sorting potentially recyclable items as disclosed above, a computing system (FIG. 1 element 175) is also disclosed that may incorporate a number of capabilities useful in coordinating activities and providing information to workers in such a facility. FIG. 4 illustrates a variety of components of one embodiment of such a computing system. The computing system may comprise a number of inputs and outputs along with internal computational and processing elements. The various components of the computing system may be in mutual communication by means of a communications bus 405. The computational components may include at least one processor 425 in data communication with some components of computer memory, such as dynamic memory 430 and static memory 440. While only a single processor unit 425 is illustrated in FIG. 4, it is understood that such a computing system may incorporate a number of processing units acting either sequentially or in parallel. Dynamic memory components 430 may include, without limitation, DRAMS and VRAMS. Static memory components 440 may include, as non-limiting examples, disk drives, thumb drives, flash drives, ROMs, PROMs, EPROMS, and CD-ROM drives. Static memory, dynamic memory, or both static and dynamic memory may be used to hold operating instructions and/or data for the computing system for use in accomplishing the variety of its activities. It is understood that the computing system may also be in communication with other computing systems that may hold additional instructions and/or data for accomplishing the activities used in the sorting facility. Additional computational elements may be included in the computing system such as digital signal processing (DSP) modules 435.

The computing system may receive a variety of inputs, including inputs from sensor systems 410, augmented reality interfaces 415, and from interface devices from an operator 420. Sensor system output data may include, without limitation, serial digital data, parallel digital data, and analog data. The input interface for the sensor data 410 may include a wired interface or a wireless interface. AR interface output data received by the computing system through the AR device input interface 415 may include video data or voice data. The computing system input interface from the AR interfaces may include either wired or wireless interfaces or both, including, without limitation, RF wireless interfaces, a LAN interface, a WAN interface, or an IR interface. Operator inputs may be provided through interfaces to one or more input devices including, but not limited to, a keyboard, a mouse, a voice recognition system, and a digital tablet interface.

The computing system may also provide a number of data outputs to a variety of components of the sorting system. The computing system may provide outputs to control illumination sources 450. Such controls may include without limitation, control of the illumination intensity, control of the illumination spectral characteristics, on/off controls, and illumination pulse controls. Illumination controls may also include controls for the activation or use of optical elements associated with the illumination sources, or controls of the placement of illumination sources with respect to the sorting surface or one or more items on the sorting surface. Additionally, the computing system may also provide output data to control the motion of one or more sorting surfaces through a sorting surface control interface 455. Further, the computing system may provide control outputs to a variety of sensors through sensor control interfaces 460. Sensor controls may further include control of the placement of the sensors, such as directing the orientation of a camera. Additional controls may include control of devices to adjust or shape illumination impinging on the sensor systems. The AR interfaces may receive data streams via the AR device output interface 465. The interface 465 may include wired or wireless interfaces to the one or more AR interfaces. A further example of a computing system output interface may direct information to one or more devices used by a system operator 470. Embodiments of such output devices may include visual monitors such as CRT monitors, LED monitors, and LCD monitors, video monitors, and auditory devices such as speakers, as non-limiting examples.

It is understood that the computing system may also be in data communication with any number of other devices not specifically disclosed above. Connectivity to such additional devices may be accomplished by means of additional communication interfaces 475. In one embodiment, the computing system may be in data communication with one or more additional computing devices to provide multi-processor computation capabilities. In another embodiment, the computing system may communicate with a server that hosts one or more libraries of spectral data related to the composition of sortable items. In yet another embodiment, the computing system may provide process efficiency data to a second computer device to record the amount of sortable items binned during a particular work shift.

Figure 5:
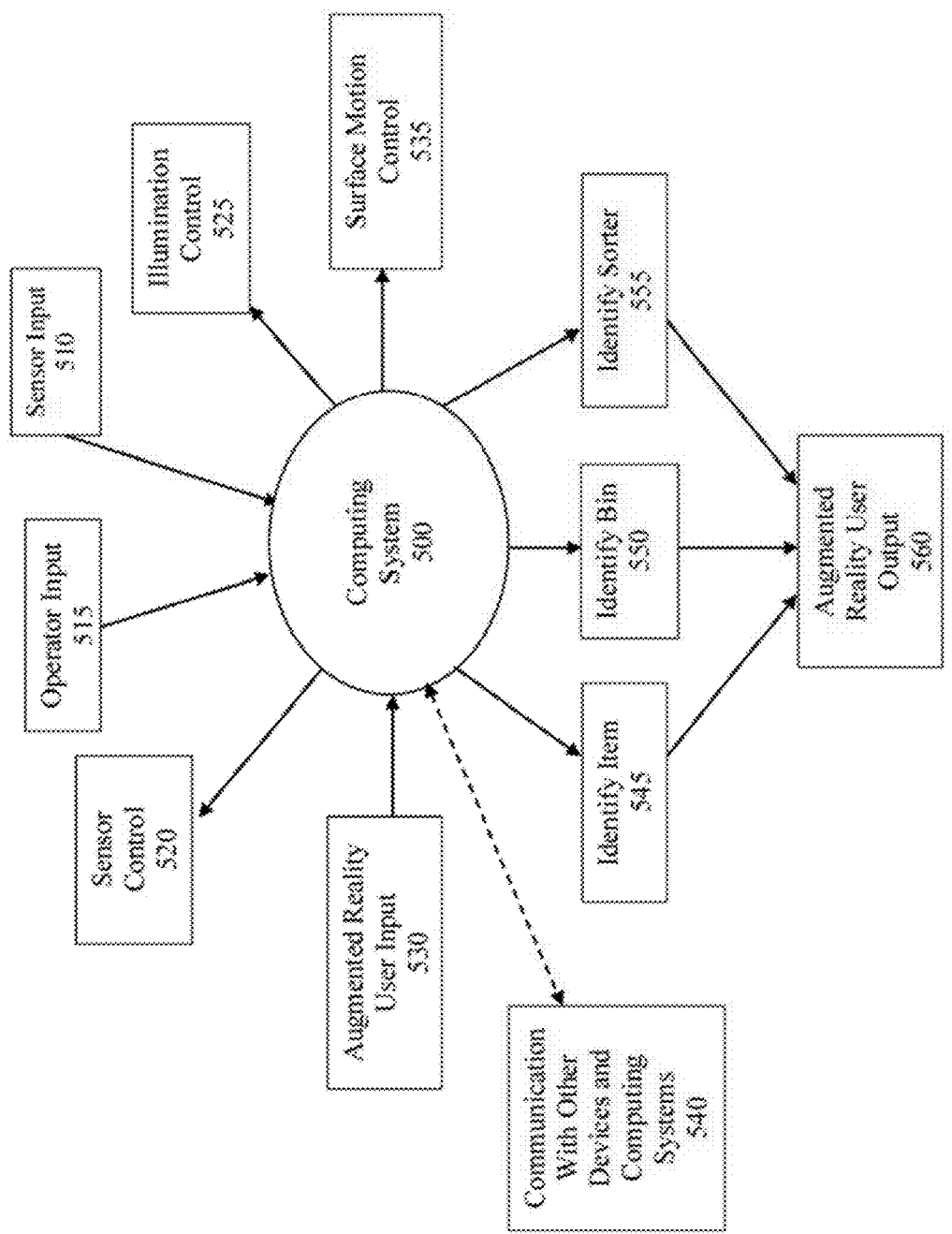
FIG. 5 illustrates an embodiment of the interaction between the computing system and other components of the processing system in accordance with the present disclosure.

FIG. 5 illustrates an embodiment of interactions that a computing system 500 may have with the other components of the sorting facility. Computing system 500 may receive inputs from one or more augmented reality user interfaces 530 from a computing system operator 515, from one or more sensor systems 510, as well as from other devices such as servers 540. The computing system may also provide outputs to a number of systems such as sensor control systems 520, illumination control systems 525, surface motion control systems 535, and addition devices 540. The computing system may also provide augmented reality data streams to the augmented reality user interface 560, as well as to the computing system operator.

The computing system may receive input data from one or more of the AR user interfaces 530. Such data may include without limitation voice data from the AR interface user, image and/or video data, and localization data. Voice data may include queries, comments, or responses to audio AR reality sensations. The voice data may be analyzed by voice recognition systems and the data may be used as data input to the computing system. Comments may be logged either as text or voice recordings. Some comments may be addressed to either the operator or other AR interface users, and may be passed along to them as text or audio streams. Image and/or video data may include without limitation, a video stream corresponding to the field of view observed by the AR interface user, or data related to gestures such as pointing to items on the sorting surface. The image data may be used as feedback input for the computing system in order for it to provide visual AR sensations to the user. The video information may also be provided to the computing system operator so that he or she may be able to observe any problems the user may have during the sorting process. The localization data input may be used by the computing system to track and locate the AR interface user within the sorting facility.

The computing system 500 may receive a variety of inputs from the operator 515 via operator input interfaces such as keyboards, mice, operator voice input, and storage devices such as thumb drives that may contain data relevant to the sorting operation. The information provided by the operator may include data related to the recycling process workstream. As disclosed below, the computing system may have any one of a number of methods or algorithms to analyze the data from the sensor systems. Workstream input by the operator may include any one or more of the following specifications: one or more types of compositional analysis to be used on the sensor system data from the sortable items; one or more types of positional or location analyses of sensor system data related to the position of the items on the sorting surface; the number of AR interface users recommended to perform the sorting tasks; the number of sorting bins to be used; the location of the sorting bins in the sorting facility; the type of bins to receive the sortable item based on the item size and/or shape; the disposition of the one or more AR interface users with respect to the sorting surface or surfaces; and the bin to receive a sortable item based on the item's composition. Additional workstream-related inputs from the operator may include without limitation any one or more of the composition or compositions, or expected composition or compositions of the sortable items, the source of the items, the location of the sortable items on the sorting surface, one or more performance metrics related to the sorting efficiency of the one or more AR interface users, and data related to the economic market valuation or requirement for any one or more types of sortable items. It may be understood that some operator data input may be used by the computing system to determine or calculate any one or more of the non-limiting workstream specifications as disclosed above.

Computing system 500 may also receive a variety of sensor system inputs 510. As disclosed above, the sensor input data may include, without limitation, any one or more of digital data, analog data, image data, or video data. Image and video data may be inputs from still or video cameras. In some embodiments, the video and/or image data may be used by algorithms stored in the computing system 500, along with data related to at least some of the sources of illumination, to calculate location information of the items on the sorting surface(s). Alternatively, the camera data may be used along with iGPS data from the individual sorters (AR interface users) so their locations in the facility may be mapped as well.

Other sensor system inputs 510 may be analyzed by computing system 500, in relation to information related to one or more sources of illumination and/or the illumination they provide, to calculate information related to the composition of the one or more sortable items. Depending on the sensor and/or illumination, the analysis may encompass any one or more of such non-limiting techniques as photon, electron, and/or magnetic resonance spectroscopy.

It may be appreciated that computational algorithms for location determination and item and/or worker tracking may require additional computational resources 540 in addition to those provided by computing system 500. Additional computational resources 540 may also be used to assist in computing the composition or compositions of sortable items. Additional devices, for example, may include servers maintaining a library or libraries of spectral or other analytical data related to the compositions of sortable items.

Computing system 500 may also provide output data to any one or more of the systems disclosed above. In one non-limiting example, computing system 500 may provide control data to one or more of the sensor systems 520. For example, an operator may mount one or more optical elements on an optical element moving system. Such elements may include, without limitation, filters, polarizers or resolvers, dichroic mirrors, slits, or collimators. The computing system may then control which of the variety of optical elements may be presented in the optical path of the sensor system to tailor the spectrum or shape of the input illumination for specific analytical purposes. In another embodiment, the computing system may provide control over the location and/or field of view of the sensor systems. Such control may include without limitation an iris to increase or decrease the field of view of a sensor. In one embodiment, a sensor such as a camera may be mobile, and the control may modify the position of the camera or its orientation with respect to the sorting surface or items on the sorting surface. The computing system may also provide feedback to any one or more sensor systems to modify its response.

In another embodiment, computing system 500 may provide control data to any one or more of the sources of illumination 525. Examples of such control may include, without limitation, any one or more of the illumination intensity, illumination spectrum, illumination focus, a pulse width and/or duration of the illumination, or whether a particular illumination source is on or off. In an embodiment, the sources of illumination may be mobile, and the computing system may send output data to the devices that control the position of the illumination. The illumination may therefore be directed to one or more sortable items, one or more sections of the sorting surface, or both the sortable items and the sorting surface.

In still another embodiment, the computing system 500 may provide data to systems and/or devices used to control the motion of the one or more sorting surfaces 535. The sorting surfaces may be controlled by one or more surface controllers, the surface controllers receiving inputs from the computing system. For example, the surface controllers may cause the surfaces to move in a forward direction (from the one or more analytical stations to the one or more sorters). The controllers may also cause the sorting surface to move in a backwards direction, for example if one or more sortable items could not be analyzed properly during a first pass through compositional analysis stations. The computer output to the surface controllers may also control the speed of the surface motion, and may even cause the surface to stop for some period of time.

Computing system 500 may also provide a variety of outputs as one or more augmented reality data streams to the augmented reality interfaces used by the AR interface users 560. The one or more augmented reality data streams may comprise, without limitation, data related to the composition of one or more sortable items 545, the location of the one or more sortable items on a sorting surface, an identifier of the bin to receive a particular sortable item 550, and an identifier of the worker 555 to sort the item and place it into a bin 555. In this manner, the computing system may be able to direct one or more AR interface users to sort the items into appropriate bins. The augmented reality data streams may also provide the AR interface users or the system operator with additional non-limiting information regarding the source or origin of the sortable items, metrics regarding worker performance attributes, or market related information (such as market valuation or need) of the sortable; items. Examples of performance metrics may include the number of items a specific worker sorted over a time period, the number and length of absences from a sorting station, and similar attributes.

The sortable items may be identified according to their composition 545. The composition may be determined based at least in part on the input data received from the one or more sensor systems along with information related to the one or more sources of illumination. Compositional data may be derived through one or more analytical methods, including, but not limited to, photon spectroscopy, electron spectroscopy, and magnetic resonance spectroscopy. Embodiments of photon spectroscopy may include without limitation, reflectance spectroscopy, absorption spectroscopy, Raman spectroscopy, fluorescence spectroscopy, x-ray spectroscopy, laser-induced breakdown spectroscopy, and surface plasmon resonance spectroscopy. Embodiments of electron spectroscopy may include, without limitation, Auger spectroscopy, secondary photoelectron emission spectroscopy, and photoelectric emission spectroscopy. Embodiments of magnetic resonance spectroscopy may include, without limitation, nuclear magnetic resonance spectroscopy and electron spin resonance spectroscopy. It may be appreciated that the computing system 500 may also be used to control any ancillary devices and/or equipment that may be necessary to perform these analytical techniques, such as controlling the magnetic fields required for magnetic resonance spectroscopies.

As disclosed above, there may be sortable items composed of more than one type of composition. As part of the AR data stream provided to a user, computer system 500 may include directions to the AR interface user that a particular item requires disassembly into subcomponents (for example the container and the cap). The information may be provided to the user visually (see FIG. 3, text display elements 320) or audibly by means of a computer synthesized voice heard over the AR interface audio interface.

In addition, the sortable items may be identified according to their location on the sorting surface. The AR interface user may receive this information as an AR sensation such as a visual indicium overlaid on an item in the AR user's field of view (see FIG. 3, element 325). An item's location may be determined based at least in part on the input data received from the one or more sensor systems, for example from camera or video systems. Computing system 500 may analyze the data from a number of such imaging sensors to determine the location of the items on the sorting surface. The methods for computer localization of the items may comprise one or more of a Kalman filter technique, a Gaussian sum technique, a grid-based technique, a particle filter technique, a wavelet filter technique, a shadowing filter technique, a fuzzy predictive filter technique, a supervised learning technique, a point tracking technique, a probabilistic technique, a kernel tracking technique, a contour tracking technique, and a multiple sensor tracking technique.

Figure 6:
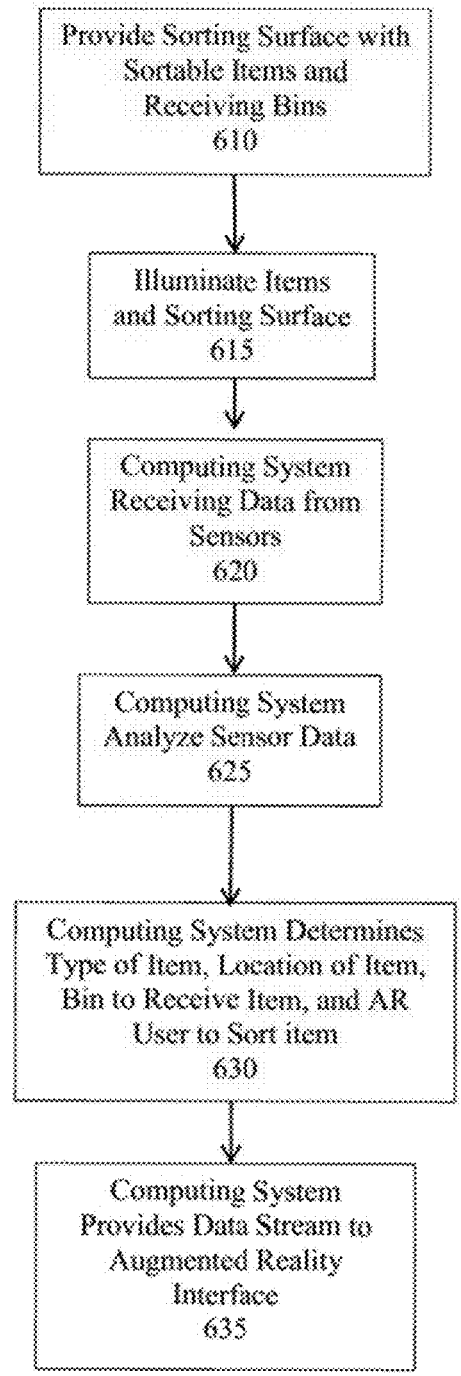
FIG. 6 is a flow chart of an embodiment of the method of processing materials in accordance with the present disclosure.

A method of processing and sorting materials in a recycling workstream may incorporate the use of the systems and devices disclosed above. FIG. 6 is a flowchart of one embodiment of such a method. In the embodiment of the method, a sorting facility may be provided with a sorting surface on which a number of sortable items may be placed 610. In addition, one or more bins to receive the sorted items may also be provided 610. The sorting facility may also provide a variety of illumination sources to illuminate the sortable items and/or the sorting surface on which they are placed 615. One or more sensor systems may receive data based on the illumination of the surface and/or the sortable items. The data may be related to one or more of absorbed illumination, reflected illumination, refracted illumination, diffracted illumination, or emitted illumination, as non-limiting examples. Output from the one or more sensors may be provided to the computing system 620. The computing system may analyze the sensor data 625, and computing one or more of an item composition, an item type, an item location on the sorting surface, a bin to receive the sorted item, and an AR user to bin the sorted item 630. The results of the computing system analyses, which may include at least some analyses of the sensor system outputs, may be provided to the one or more AR interface users as one or more AR interface data streams over a communication line, such as by wireless remote transmission 635. The data streams may be presented to the AR interface users as one or more augmented reality sensations. The AR sensations may be related at least to information regarding the sorting of the items, including the bin into which an AR interface user may deposit a specific sortable item. The augmented reality user interfaces may also provide output data to the computing system or to other AR interfaces.

EXAMPLES

Example 1

Method of Providing an Augmented Reality Sensation to a User

In one configuration, a stream of objects, each comprising polyethylene terephthalate (PET), polyvinyl chloride (PVC), polyethylene (PE), or polycarbonate, may be presented to an augmented reality user for sorting. The AR interface may overlay the objects observed on the sorting surface with highlight in which the various polymers are outlined in different colors: e.g. PET as red, PVC, as blue, PE as green, and polycarbonate as purple. Additional information may include compositional information appearing as text or additional coding in the AR interface. In one system, content purity of each object may be indicated by the brightness of the outline color; more vivid colors may indicate higher purity. Alternatively, content purity of the sample may be displayed in terms of the jaggedness of outlined shapes in which more jagged outlines indicate lesser purity. In yet another alternative example, the degree of purity (such as percent composition) may be displayed as text superimposed on the object image.

Example 2

Method of Sorting a Group of Sortable Objects by an AR Interface User

A stream of small sortable objects may be presented to the illumination and sensors so that their content may be analyzed and their placement on the sorting surface may be determined by the computing system. The computing system may then supply augmented reality data streams to the AR interface users to inform them of the composition of each of the sortable objects. For a stream of small objects, the sorters may then divert the waste into a number of lanes on the moving sorting surface, each lane containing objects having the same composition. For example, as the sorting surface moves between a group of sorters, the sorters may simply push the objects into a specific lane based on composition (e.g. a left-most lane for PET objects, a center lane for PE objects, and so on). At the end of the moving surface, a sorter may have pre-arranged bins placed to receive the objects from each lane as they fall off the surface into the appropriate bin.

Example 3

Method of Sorting Objects Having a Heterogeneous Composition

In another commercial example, a group of pulverized 0.1 m to 4 m pieces of automotive parts may be presented to the sorting system. The sensors and illumination sources may present data to the computing system regarding the composition and location of each piece. A combination of illumination sources and sensors may identify that some of the sortable items may have a heterogeneous composition (for example, part plastic, part metal). A sorter, viewing a particular piece through the augmented reality interface, may observe that the piece has a mixed composition. As the sorter manipulates the piece, the AR interface may display different color overlays over the portion of piece as it is manipulated. For example, a copper portion may be overlaid with a purple color, while a PET portion may be overlaid with a green color. The AR interface may shift the colors as the piece is rotated in the sorter's field of view. The sorter could then use his or her judgment to determine if a particular piece has too much copper for a PET processing step, and bin it accordingly.

Example 4

System for Sorting a Group of Sortable Objects by an AR Interface User

A high intensity broad-band near-IR (NIR) lamp may be positioned above a conveyer belt. Sixteen CCD cameras may be divided into four groups of four cameras. Each group of four cameras may have one camera fitted with one NIR filter at each of the following pass frequencies: 1600 nm, 1700 nm, 1700-2150 nm, and 2115-2550 nm. Each group of cameras may then be staggered in spatial location, linearly over the belt, in sequential order by filter cutoff wavelength (1600 nm CCD, 1700 nm CCD, 1700-2150 nm CCD, 2115-2550 nm CCD). Each group of cameras may follow in sequence the previous group of cameras. Each object may then be assayed for reflected or absorbed light at each of the filter bands four separate times for redundancy. The computing system may then poll the sensors for a majority determination of composition. In the event that an object does not have a consistent spectral response, information may be presented over the AR interface to a sorter, letting him or her know that the object should be set aside for further consideration.

Example 5

A Method of Processing Materials for a Workstream

An automated chute may continuously deposit sortable objects onto a moving sorting surface. As the objects pass by a series of illumination sources and sensors, they may be characterized by content and location on the surface according to a computing system receiving data from the sensors. The computing system may provide a group of sorters, using augmented reality interfaces, with information regarding how to bin each object. The sorters may continue to place objects by composition into appropriate bins until the bins become full. In one configuration, a sorter may then stop sorting and move the bin to a shipping location. During the time the sorter is away from his or her position by the sorting surface, the sorter may notify a facility operator of this break in the sorting process over a voice transmitting channel associated with the AR interface. Alternatively, another facility worker may move the bin to a post-processing station (such as a station to box the items for shipping to another facility). If the post-processing station becomes overburdened due to a large amount of material to ship out, the post-processing worker may notify the facility operator over an AR interface voice channel that the sorting process for that particular material should be delayed. In either alternative, the facility operator may then direct the computing system to slow the travel of the moving sorting surface or even stop it entirely. In this manner, the sorting process may be adapted to changes in the work flow.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity.

It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. A system for processing materials for a recycling workstream, the system comprising:
    at least one sorting surface configured to hold at least one of a plurality of sortable items;
    at least one bin configured to receive the at least one of the plurality of sortable items;
    at least one illumination source configured to illuminate the at least one of the plurality of sortable items while the at least one of the plurality of sortable items is on the at least one sorting surface;
    at least one sensor system having an output configured to receive at least one sensor input from the at least one of the plurality of sortable items while the at least one of the plurality of sortable items is on the at least one sorting surface;
    at least one augmented reality interface having at least one input and at least one output, the at least one output configured to provide at least one augmented reality interface user with at least one augmented reality sensation; and
    a computing system in data communication with the at least one sensor system output and the at least one augmented reality interface input,
    wherein the computing system is configured to receive an identity of a facility from which the plurality of sortable items are received,
    wherein the computing system is configured to provide at least one augmented reality data stream to the at least one augmented reality interface based at least in part on an analysis of the output of the least one sensor system,
    wherein the at least one augmented reality data stream comprises information for the at least one augmented reality interface user regarding sorting the at least one of the plurality of sortable items into the at least one bin, and
    wherein a number of the at least one augmented reality interface user for sorting and separating the plurality of sortable items depends at least in part on the identity of the facility from which the plurality of sortable items are received.

2. The system of claim 1, wherein the computing system is configured to receive a workstream input and determine at least one of:
    a specification of at least one type of analysis of a composition of the at least one of the plurality of sortable items;
    a specification of a number of the at least one bin to receive the at least one of the plurality of sortable items;
    a specification of a location of the at least one bin with respect to the location of the at least one of the plurality of sorting surfaces;

a specification of a type of the at least one bin to receive the at least one of the plurality of sortable items;

a specification of a location of the at least one augmented reality interface user with respect to a location of the at least one of the plurality of sorting surfaces; and a specification of the at least one bin to receive at least one sorted item of the plurality of sortable items.

3. The system of claim 1, wherein:

the at least one sorting surface comprises at least one moving surface controlled by at least one surface controller; and the at least one surface controller is controlled at least in part by a surface controller input from the computing system.

4. The system of claim 1, wherein the analysis of the output of the least one sensor system comprises an analysis of a composition of the at least one of the plurality of sortable items.

5. The system of claim 1, wherein the at least one sensor system further comprises at least one optical element.

6. The system of claim 5, wherein the at least one optical element is mounted on an automated optical element moving system configured to move the at least one optical element with respect to an optical path of the at least one sensor system.

7. The system of claim 1, wherein the at least one augmented reality interface comprises one or more of the following: a visual interface, an audio interface, a voice recognition interface, and a localization interface.

8. The system of claim 1, wherein the at least one augmented reality interface comprises a localization interface comprising at least an indoor GPS system.

9. The system of claim 1, wherein the at least one output of the at least one augmented reality interface comprises at least an output to the computing system.

10. The system of claim 1, wherein:

the at least one augmented reality interface comprises at least a first augmented reality interface and a second augmented reality interface in data communication with the first augmented reality interface.

11. The system of claim 1, wherein the at least one augmented reality data stream comprises one or more of the following:

data related to a composition of the at least one of the plurality of sortable items;

data related to a location of the at least one of the plurality of sortable items on the at least one of the plurality of sorting surfaces;

data related to the at least one bin to receive at least one of the plurality of sortable items; and data related to an identity of the at least one augmented reality interface user that separates the at least one of the plurality of sortable items from the remainder of the plurality of sortable items.

12. The system of claim 1, wherein the at least one augmented reality sensation comprises one or more of the following:

an audible instruction to the at least one augmented reality interface user;

a readable text superimposed on a field of view of the at least one augmented reality interface user; and at least one visual indicium superimposed on the field of view of the at least one augmented reality interface user.

13. The system of claim 1, wherein the computing system is configured to analyze a composition of the at least one of the plurality of sortable items, based at least in part on the at least one illumination source and the output of the at least one sensor system.

14. The system of claim 1, wherein the computing system is configured to track a location of the at least one of the plurality of sortable items on the at least one sorting surface, based at least in part on the output of the at least one sensor system.

15. The system of claim 1, wherein the computing system is configured to track a location of the at least one augmented reality interface user based at least in part on a localization interface associated with the at least one augmented reality interface.

16. A method of processing materials for a recycling workstream, the method comprising:

determining an identity of a facility from which at least one of a plurality of sortable items is received;

providing at least one sorting surface to hold the at least one of the plurality of sortable items;

providing at least one bin to receive the at least one of the plurality of sortable items;

illuminating at least one of the plurality of sortable items using an at least one illumination source while the at least one of the plurality of sortable items is on the at least one sorting surface;

receiving, by at least one sensor system having an output, at least one sensor input from the at least one of the plurality of sortable items while the at least one of the plurality of sortable items is on the at least one sorting surface;

providing at least one augmented reality interface having at least one input and at least one output, the at least one output providing at least one augmented reality interface user with at least one augmented reality sensation; and providing a computing system in data communication with the at least one sensor system output and the at least one augmented reality interface input, wherein providing a computing system comprises providing a computing system to supply an at least one augmented reality data stream to the at least one augmented reality interface based at least in part on an analysis of the output of the least one sensor system and the identity of the facility from which the at least one of the plurality of sortable items is received, and wherein providing the at least one augmented reality data stream comprises providing information for the at least one augmented reality interface user regarding sorting the at least one of the plurality of sortable items into the at least one bin.

17. The method of claim 16, further comprising directing the at least one of the augmented reality interface users to sort the at least one of the plurality of sortable items into the at least one bin.

18. The method of claim 17, wherein directing at least one of the augmented reality interface users to sort at least one of the plurality of sortable items into the at least one bin comprises at least one of:

specifying at least one type of analysis for a composition of the at least one of the plurality of sortable items;

specifying at least one type of analysis for a location of the at least one of the plurality of sortable items on the at least one of the plurality of sorting surfaces;

specifying a location of the at least one bin with respect to the location of the at least one of the plurality of sorting surfaces;

specifying a number of the at least one bin to receive the at least one of the plurality of sortable items;

specifying a type of the at least one bin to receive the at least one of the plurality of sortable items;

specifying a number of the at least one augmented reality interface users for sorting and separating the plurality of sortable items;

specifying a location of the at least one augmented reality interface user with respect to a location of the at least of the plurality of sorting surfaces; and specifying at least one bin to receive at least one sorted item of the plurality of sortable items.

19. The method of claim 17, wherein directing the at least one augmented reality interface user to separate the at least one of the plurality of sortable items includes one or more of the following: a composition of the at least one of the plurality of sortable items, a source of the plurality of sortable items, a location of the least one of the plurality of sortable items on the at least one sorting surface, a performance attribute of the at least one augmented reality interface user, and an economic market requirement for a type of the at least one of the plurality of sortable items.

20. The method of claim 16, further comprising providing information to the at least one augmented reality interface user regarding disassembling the at least one of the plurality of sortable items into at least a first subcomponent and a second subcomponent, wherein the first subcomponent comprises a first composition and the second subcomponent comprises a second composition.

21. The method of claim 16, further comprising:
mounting at least one optical element on an automated optical element moving system; and
moving the at least one optical element using the automated optical element moving system with respect to an optical path of the at least one sensor system.

22. The method of claim 16, further comprising providing the at least one output of the at least one augmented reality interface to the computing system.

23. The method of claim 16, further comprising communicating an information stream from at least a first augmented reality interface to at least a second augmented reality interface.

24. The method of claim 16, further comprising analyzing, by the computing system, a composition of the at least one of the plurality of sortable items based at least in part on the at least one illumination source and the output of the at least one sensor system.

25. The method of claim 16, further comprising tracking, by the computing system, a location of the at least one of the plurality of sortable items on the at least one sorting surface based at least in part on the output of the at least one sensor system.

26. The method of claim 16, further comprising tracking, by the computing system, a location of the at least one augmented reality interface user based at least in part on a localization interface associated with the at least one augmented reality interface.

* * * * *

UNITED STATES PATENT AND TRADEMARK OFFICE
CERTIFICATE OF CORRECTION

PATENT NO.       : 8,947,456 B2
APPLICATION NO.  : 13/515404
DATED            : February 3, 2015
INVENTOR(S)      : Chen et al.

It is certified that error appears in the above-identified patent and that said Letters Patent is hereby corrected as shown below:

In the Specification

In Column 2, Line 26, delete "data," and insert -- data --, therefor.

In Column 5, Line 45, delete "solace" and insert -- source --, therefor.

In Column 10, Line 17, delete "EPROMS," and insert -- EPROMs, --, therefor.

In Column 15, Line 14, delete "PVC," and insert -- PVC --, therefor.

Signed and Sealed this
Seventh Day of July, 2015

Michelle K. Lee
*Director of the United States Patent and Trademark Office*